A. H. SWEET.
SIDE BUMPER FOR VEHICLES.
APPLICATION FILED MAY 4, 1920.

1,353,553.

Patented Sept. 21, 1920.

INVENTOR
ALVIN H. SWEET;
BY
ATTORNEY

UNITED STATES PATENT OFFICE.

ALVIN H. SWEET, OF LOS ANGELES, CALIFORNIA.

SIDE BUMPER FOR VEHICLES.

1,353,553.

Specification of Letters Patent.   Patented Sept. 21, 1920.

Application filed May 4, 1920. Serial No. 378,823.

*To all whom it may concern:*

Be it known that I, ALVIN H. SWEET, a citizen of the United States, residing at Los Angeles, in the county of Los Angeles and State of California, have invented new and useful Improvements in Side Bumpers for Vehicles, of which the following is a specification.

This invention relates to a bumper or guard for auto vehicles and the like and particularly pertains to a fender which is particularly adapted for use as a side guard to an auto vehicle to protect the running board thereof.

It is the object of this invention to provide a bumper or guard adapted to be mounted on the side frame of the chassis of an auto vehicle and positioned to extend lengthwise of the running board adjacent to the outer edges thereof in such manner as to afford protection against injury to the running board by broad-side collisions and the like.

Another object is to provide an adjustable mounting for supporting the bumper bar on the vehicle frame by which the mounting and the bumper bar may be positioned on various types of auto vehicles having running boards of different widths and spacings relative to the vehicle frame.

A further object is to provide a strong and substantial mounting for a side bumper bar which may be readily applied to most auto vehicles now generally in use.

Other objects will appear hereinafter.

The invention is illustrated in the accompanying drawings, in which.

More specifically, 5 indicates the side frame member of the chassis of an auto vehicle or the like which is here shown as comprising a channel-iron arranged with is channel innermost, as is common in automobile construction, and 6, indicates the dependent hangers or brackets fastened to the frame member 5 and having an outwardly extending portion on which the running board 7 of the vehicle is mounted in the ordinary manner.

Figure 1:
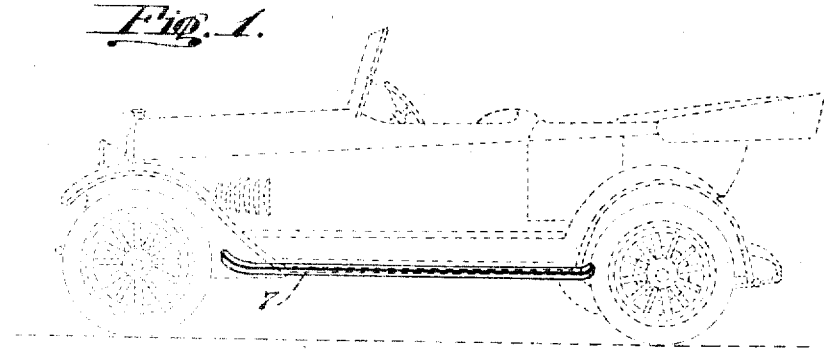
Figure 1 is a perspective view illustrating the application of the invention.
Figure 2:
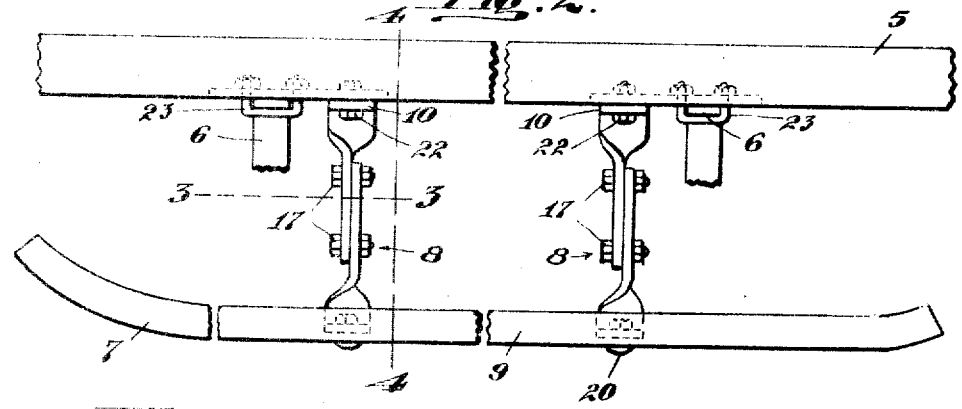
Fig. 2 is a plan view of the bumper bar and its mounting with parts broken away.
Figure 3:
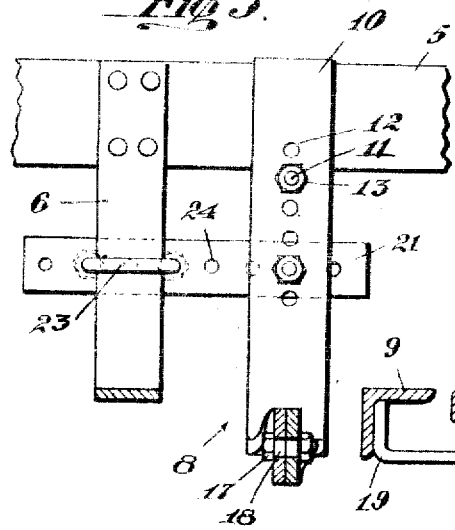
Fig. 3 is an enlarged detail section and elevation as seen on the line 3—3 of Fig. 2.
Figure 4:
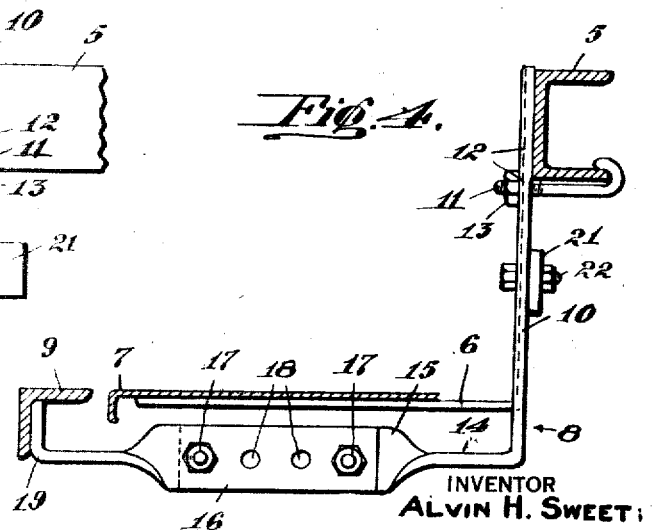
Fig. 4 is an enlarged detail section and elevation as seen on the line 4—4 of Fig. 2.

In carrying out my invention, I provide a pair of adjustable supplemental brackets or hangers 8 to serve as supports for a horizontally extending bumper bar or guard 9, by which the latter may be carried on the frame member 5 and disposed alongside or adjacent to the longitudinal outer edge of the running board 7. Each bracket 8 comprises a vertical, dependent portion 10 which is adapted to be secured to the outer face of the frame member 5 in spaced relation to the hanger 6 and is here shown as fastened in place by a hook bolt 11 which bolt is passed through anyone of a series of openings 12 formed in the portion 10 of the bracket and is hooked into engagement with the lower flange of the frame member 5 as shown in Fig. 4 and engaged with the bracket to tightly clamp the latter in place by means of a nut 13 screwed on the outer end portion of the bolt. A series of the openings 12 are provided so that the bolt may be secured to the bracket at various points according to the distance it is desired to project below the frame member. By employing a hooked bolt, the bracket may be readily secured to the frame member without the necessity of drilling the latter.

The member 10 is bent outwardly at its lower end to form a horizontally extending portion 14 which is twisted to form a vertically extending plate 15 adapted to abut against a corresponding plate 16 and to be secured to the latter by a pair of bolts 17 passing through registering perforations 18 in the plates; the plates being formed with a series of the perforations 18 to permit their being adjusted lengthwise relative to each other so as to vary the length of the lower portion 14 of the hanger as occasion may require. The outer end of the plate 16 is formed with an upturned flange 19 on which the bumper 9 is mounted; the bumper bar being here shown as formed of angle iron and may be secured to the flange 19 by a bolt 20 or other suitable fastening.

As a means for bracing the hangers 8 and for holding them against swinging on the single bolts 11 from which they are suspended, a tie plate 21 is provided which is secured to the depended portion 10 of the hanger by a bolt 22 or similar fastening which is engaged with one of the openings 12 and which tie plate is also secured to the hanger 6 by means of a U-bolt 23 arranged astride the hanger and passing through perforations 24 in the tie plate. A series of the perforations 24 are provided in the tie plate to permit various spacings of the hanger 8 from the hanger 6 and to provide means for connecting the U-bolt to the tie plate accordingly.

In the application of the invention the hanger 8 is secured to the frame member 5 by the hook bolt and is adjusted thereon to hold the horizontally extending portion of the bracket 14 adjacent to the underside of the running board 7, and the tie plate is secured to the hangers 6 and 8 as before described, thus effecting a rigid mounting of the hanger 8. The portions 15 and 16 of the bracket 8 are adjusted lengthwise of each other according to the width of the running board 7 to position the bumper bar 9 along the outer edge of the latter. The bumper bar may be of any desired length but preferably extends from a point adjacent to the rear wheel of the auto vehicle to a point adjacent to the front wheel thereof. The end portions of the bumper bar are curved inwardly to form guards to prevent the ends of the bumper bar from becoming engaged with obstacles and to also afford deflecting means.

From the foregoing it will be seen that I have provided a means for mounting the bumper bar so that it may be fitted to meet varying conditions, such as running boards of different widths and spaced at different distances from the frame member.

While I have shown and described a specific embodiment of my invention, I do not limit myself to the exact details of construction shown, but may resort to such changes and modifications as occasion may require and as come within the scope of the appended claims, without departing from the spirit of the invention.

I claim:

1. In a vehicle, the combination with a side frame of a vehicle, and a running board thereon; of a pair of dependent hangers secured to said frame member and extending beneath the running board, and a bumper bar carried by said hangers arranged to extend lengthwise of said running board adjacent the outer edge thereof.

2. In a bumper for auto vehicles, the combination with the side frame member and the running board of a vehicle, of a pair of hangers, a means for mounting said hangers on the frame member, said hangers having an adjustable horizontally extending portion adapted to project outwardly beneath the running board, and a bumper bar carried on the outer extremities of the lower portion of said brackets arranged to extend lengthwise of the running board adjacent to the outer edge thereof.

3. In a bumper for auto vehicles, the combination with the side frame member and the running board of a vehicle, of a pair of hangers, a means for adjustably mounting said hangers on the frame member, said hangers having an adjustable horizontally extending portion adapted to project outwardly beneath the running board, and a bumper bar carried on the outer extremities of the lower portion of said brackets arranged to extend lengthwise of the running board adjacent to the outer edge thereof.

4. In a side bumper for auto vehicles, a chassis having a side frame, brackets depending from said frame, a running board carried by said brackets, a pair of supplemental brackets affixed to said frame, tie plates connecting said supplemental brackets to the first named brackets, and a bumper bar carried by said supplemental brackets extending lengthwise of said running board adjacent to the outer edge thereof.

5. In a side bumper for auto vehicles, having a side frame member formed with an inturned flange, a pair of brackets depending from said frame member, and a running board carried by said brackets; a pair of supplemental hangers, hook bolts engaging the flange on said frame and engaging with said supplemental hangers, a tie connecting said supplemental hangers to the first named hangers and a bumper bar carried by said supplemental hangers extending lengthwise of the running board adjacent to the front edge thereof, In testimony whereof I here sign my name to this specification.

ALVIN H. SWEET.